United States Patent
Yokoi et al.

(10) Patent No.: US 8,473,319 B2
(45) Date of Patent: Jun. 25, 2013

(54) SYSTEM FOR PROVIDING GOAL-TRIGGERED FEEDBACK

(75) Inventors: Yumiko Christine Yokoi, San Francisco, CA (US); Nancy V. Lang, Palatine, IL (US); Justin Craig Field, Bellevue Hill (AU); Andrew Philip Gillibrand, Berkshire (GB); Steven K. Chu, San Ramon, CA (US); Hong (Laura) Lin, Charlotte, NC (US)

(73) Assignee: Oracle International Corporation, Redwood Shores, CA (US)

( * ) Notice: Subject to any disclaimer, the term of this patent is extended or adjusted under 35 U.S.C. 154(b) by 4 days.

(21) Appl. No.: 13/407,326

(22) Filed: Feb. 28, 2012

(65) Prior Publication Data
US 2012/0303421 A1  Nov. 29, 2012

Related U.S. Application Data

(63) Continuation-in-part of application No. 13/114,596, filed on May 24, 2011.

(51) Int. Cl.
*G06Q 40/00* (2012.01)

(52) U.S. Cl.
USPC .......................................... 705/7.11; 705/7.42

(58) Field of Classification Search
USPC .......................................... 705/7, 7.11, 7.42
See application file for complete search history.

(56) References Cited

U.S. PATENT DOCUMENTS

| | | | |
|---|---|---|---|
| 5,727,950 A | 3/1998 | Cook et al. | |
| 5,862,223 A | 1/1999 | Walker et al. | |
| 6,411,936 B1 * | 6/2002 | Sanders | 705/7.32 |
| 6,527,556 B1 | 3/2003 | Koskinen | |
| 6,549,893 B1 * | 4/2003 | Lannert et al. | 706/60 |
| 6,829,585 B1 | 12/2004 | Grewal et al. | |
| 6,871,195 B2 | 3/2005 | Ryan et al. | |
| 7,120,647 B2 | 10/2006 | Venkatesh et al. | |
| 7,769,624 B1 | 8/2010 | Armentano | |
| 7,870,013 B1 * | 1/2011 | Allemann et al. | 705/7.11 |
| 7,996,257 B2 * | 8/2011 | Brooks | 705/14.42 |
| 8,131,577 B2 * | 3/2012 | Lessing et al. | 705/7.11 |

(Continued)

FOREIGN PATENT DOCUMENTS
WO  WO2010054370 A1  5/2010

OTHER PUBLICATIONS iMentor Interactive, obtained at http://www.imentor.org/imentor-interactive; Dec. 9, 2010; 1 page.

(Continued)

*Primary Examiner* — Thomas Dixon
*Assistant Examiner* — Benjamin S Fields
(74) *Attorney, Agent, or Firm* — Trellis IP Law Group, PC

(57) ABSTRACT

A system and method for encouraging the exchange of feedback in an enterprise. An example method includes providing one or more user interface controls for configuring a feedback reminder to automatically include predetermined insight pertaining to a potential participant in a future feedback exchange; sending the feedback reminder to a messaging system or application; providing a user option to view content of the feedback reminder; and displaying the feedback reminder in response to user selection of the first user option. Another user option enables selection of particular insight, derived from a talent management system, for inclusion in the feedback reminder. The messaging system may include an email application or an application for displaying a worklist.

20 Claims, 16 Drawing Sheets

U.S. PATENT DOCUMENTS

| | | | |
|---|---|---|---|
| 8,265,985 B2 * | 9/2012 | Allemann et al. | 705/7.36 |
| 2002/0077884 A1 | 6/2002 | Sketch | |
| 2003/0018506 A1 * | 1/2003 | McLean et al. | 705/7 |
| 2005/0091095 A1 * | 4/2005 | Wilbrink et al. | 705/8 |
| 2005/0197988 A1 * | 9/2005 | Bublitz | 706/46 |
| 2006/0031087 A1 | 2/2006 | Fox et al. | |
| 2008/0114838 A1 | 5/2008 | Taylor | |
| 2009/0089154 A1 * | 4/2009 | Dion | 705/11 |
| 2009/0157749 A1 * | 6/2009 | Lessing et al. | 707/104.1 |
| 2009/0327051 A1 * | 12/2009 | Nerby | 705/11 |
| 2010/0103779 A1 * | 4/2010 | Kakirde et al. | 368/10 |
| 2010/0114672 A1 | 5/2010 | Klaus et al. | |
| 2010/0198659 A1 | 8/2010 | Meltzer et al. | |
| 2010/0268594 A1 * | 10/2010 | Tung et al. | 705/14.42 |
| 2011/0112879 A1 * | 5/2011 | Fama | 705/7.14 |

OTHER PUBLICATIONS

National Mentoring Partnership; obtained at http://www.mentoring.ca.gov/pdf/e-mentor_facesheet.pdf; downloaded circa Dec. 9, 2010; 2 pages.

Priest, Curtiss W.; "Building Worldwide Mentoring Tools: Content Analysis of Visited Web Page and Matching"; Aug. 21, 2002; 4 pages.

Taleo Performance—Large Enterprise Employee Performance Management; obtained at http://www.taleo.com/solutions/taleo-enterprise-performance; May 31, 2011; 2 pages.

Blue/360—Help Your Employees Develop More Fully; obtained at http://www.explorance.com/prod_360.asp?gclid=ClzTh660hqkCFQlmbAodgR8cpw; May 31, 2011; 1 page.

* cited by examiner

FIG. 3

| Home | Navigator▽ | | | | Logged in as Brian Joseph \| Logout |
|---|---|---|---|---|---|
| Worklist \| Notifications and Approvals | | | | | |
| Show▽ Actions▽ ~94 | | | | | |
| Title | Number | Priority | Assignee | State | |
| ▦ Give feedback to Sal Rahman ~92 | 202723 | 3 | brian.joe | Assigned | |
| ▦ Review Directs' Interim Reviews | 202726 | 3 | brian.joe | Assigned | |
| ▦ Discuss Year-End Performance w/ Directs | 202729 | 3 | brian.joe | Assigned | |

Feedback Reminder: Give Feedback to Sal Rahman      Logged in as Brian Joseph | Logout   [Dismiss]

▼ Details
Assignee: Brian Joseph  ← 122
Assigned date: 9/8/10, 09:06
Task Number: 202723
Provide Feedback on: 9/15/10, 11:00

▼ Action
☑ Delay reminder by [2 ▼] [Days ▼]  ← 124
[Reply to Sal with Feedback]  ← 132

▼ Insight  ← 126
This is a reminder to give feedback to Sal Rahman. You can view the following insight:
  *Career Statement
  *Development Goals
To access this insight to help you with feedback, click on the following link: http://...  ← 130

View Feedback Insight     Logged in as Brian Joseph | Logout   132 — Notes

▼ Feedback Recipient

—Picture of Sal—

Sal Rahman
10540. Software Developer 4
Pleasanton, CA
Manager: Ariel Aimar

134

▼ Career Statement

136

My career mission is to develop an application that provides superior user experience and improves productivity and engagement.

▼ Development Goals

138

| Goal Name | Priority | Status |
|---|---|---|
| ⬜ Identify Innovation Opportunities | Low | Ongoing |
| ⬜ Pursue Industry Focused Training | High | Delayed |
| ⬜ Contribute to Profession | Medium | Ongoing |

Logged in as Brian Joseph | Logout

Note History Regarding: Feedback Reminder (1:1 with Sal), Task 20273

View ▽ | 🖼 ✏ ✖ | Sort by Date ▾        ← 152

15-Feb-2010 10:20 AM  Sal Rahman—Type: Feedback Reminder Note, Private
Tell Sal what a terrific job he did on the prototype.
Coach Sal on better listening skills during demo meetings. Present example of responding prematurely to Customer X.

20-Feb-2010 10:30 AM  Sal Rahman—Type: Feedback Given, Private
Sal, you did a terrific job on the prototype. However, consider enrolling in the communications training course, as you have the tendency to respond prematurely when answering customer questions, and in particular when answering questions asked by Customer X.

FIG. 10

SYSTEM FOR PROVIDING GOAL-TRIGGERED FEEDBACK

CROSS REFERENCES TO RELATED APPLICATIONS

This application is a continuation-in-part of the following application, U.S. patent application Ser. No. 13/114,596, entitled SYSTEM PROVIDING AUTOMATED FEEDBACK REMINDERS, filed on May 24, 2011, which is hereby incorporated by reference, as if set forth in full in this specification for all purposes.

BACKGROUND

The present application relates to software and more specifically to systems and methods for facilitating or encouraging communications, such as feedback, between persons of an organization.

Systems for facilitating communications, such as feedback between managers and subordinate employees and between mentors and mentees, are particularly important in enterprise applications, where effective communications may enhance productivity and profitability. Effective feedback may help organizations maximize workforce knowledge, skill, and talent.

Conventionally enterprise personnel communicate via email, telephone, in-person meetings, and so on. However, such mechanisms are typically not configured to motivate particular types of communications, such as periodic or ongoing feedback, which can be important for developing a high-performance workforce.

Certain enterprises may conduct annual or bi-annual performance reviews and provide limited feedback to employees. However, such feedback often pertains to employee performance near an annual or biannual review. Older but relevant feedback is often forgotten and omitted. Robust behavioral enforcement mechanisms for promoting and tracking more frequent ongoing feedback are generally lacking. Managers or employee must remember to periodically give or ask for feedback, which may occur relatively infrequently.

SUMMARY

An example method for promoting the exchange of feedback in an enterprise includes providing one or more user interface controls for configuring a feedback reminder to automatically include predetermined insight information pertaining to a potential participant in a future feedback exchange; sending the feedback reminder to a messaging system or application; providing a first user option to view content of the feedback reminder; and displaying the reminder in response to user selection of the first user option.

In a specific embodiment, a user interface control for configuring the feedback reminder enables a user to select particular insight information for inclusion in the feedback reminder. The insight may include, for example, one or more stated goals, specified interests, content of a career statement, specification of a predetermined competency or lack thereof of the potential feedback participant, and so on. The resulting displayed feedback reminder includes the selected insight or a link thereto.

Another configuration option enables triggering retrieval of the insight from an Enterprise Resource Planning (ERP) application, such as from an employee profile of a Human Capital Management (HCM) or other talent management system. The messaging system to which the feedback reminder is delivered may include an email application, such as Microsoft Outlook, or an application for displaying a worklist, such as a Human Resources (HR) application. Note that although specific types of software may be discussed, such as email, worklist, application, etc., that these are merely examples and that other types of software or features may be suitable for use with embodiments of the invention. Although email communication is discussed in a particular embodiment, other embodiments may use other forms of communication such as text messaging, voice messaging, etc.

The example method further includes providing a user option to deliver the feedback reminder to the messaging system at a particular recurring interval. Another user option enables scheduling delivery of the feedback reminder based on a particular event, such as an event specified via an electronic calendar. Another user option enables a user to append a note to the feedback reminder. Another user option enables a user to view a note history associated with the feedback reminder.

Another example method facilitates goal-triggered feedback reminders and includes providing a user option to trigger a feedback reminder based on a completion status of a specified goal or task; and upon completion of a predetermined portion of the task, displaying or delivering a goal-triggered feedback reminder to the user. The present example method may further include automatically suggesting to a user that feedback be given to or asked from group members associated with the goal pertaining to the feedback reminder. Any resulting feedback sent or received based on the reminder may be displayed near an identification of a goal in a performance evaluation document, group space user interface display screen, or goal management user interface display screen.

Hence, certain embodiments discussed herein provide targeted tools for supporting habituation of ongoing feedback exchange. The targeted tools enable generation of periodic and/or event-based reminders (e.g., goal-triggered), which may include insight and associated notes for facilitating effective feedback.

Furthermore, certain embodiments discussed herein facilitate reminding employees and managers to request feedback from individuals they work with at most relevant times (e.g., after completion of a goal), and then associating resulting feedback to appropriate performance evaluation documents. Such feedback may have relatively deep relevance, since the feedback is provided based on the employee's work at the time it occurred (e.g., as opposed to later times, after which important feedback may have been forgotten).

Enterprises are increasingly shifting from performance management as an annual event to a more frequent practice that includes coaching, informal feedback, and development planning. Day-to-day feedback between a manager (or leader, mentor, other colleague) and an employee is increasingly being recognized as an effective way to improve workforce productivity.

Conventionally, without effective tools for encouraging ongoing feedback, enterprises often relied upon employees remembering to seek or give feedback. Certain feedback reminders discussed herein may act as periodic prompts for ongoing feedback exchange, wherein the automated prompts are enhanced with individualized talent management information. Such targeted periodic prompts, i.e., feedback reminders, may increase the likelihood that users will participate in providing and seeking ongoing feedback.

BRIEF DESCRIPTION OF THE DRAWINGS

FIG. 3 is a diagram of a second example of user interface display screen, which is accessible via the user interface display screen of FIG. 2, for configuring a feedback reminder.

FIG. 4 is a diagram of a third example user interface display screen for receiving a feedback reminder via a worklist.

FIG. 7 is a diagram of a seventh example user interface display screen illustrating example contents of a feedback reminder with an option to view feedback insight.

FIG. 8 is a diagram of an eighth example user interface display screen illustrating example feedback insight associated with a feedback reminder.

FIG. 9 is diagram of a ninth example user interface display screen illustrating an example mechanism for entering a note.

FIG. 10 is a diagram of a tenth example user interface display screen illustrating an example note history, which may be accessible via the user interface display screens of FIGS. 8 and 9.

DETAILED DESCRIPTION OF EMBODIMENTS

Figure 1:
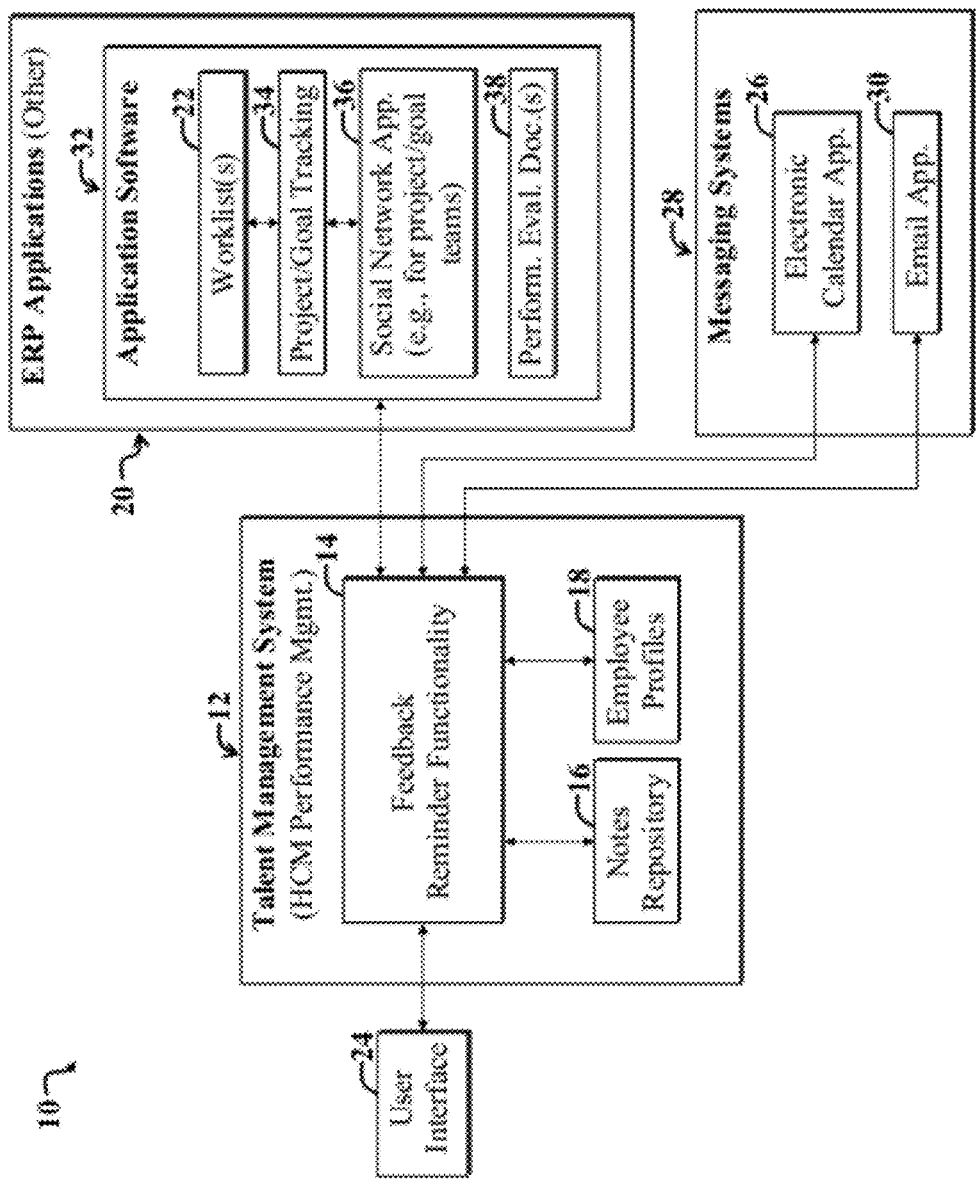
FIG. 1 is a diagram of a first example embodiment of a system for configuring and providing feedback reminders and associated feedback between enterprise personnel.

Although the description has been described with respect to particular embodiments thereof, these particular embodiments are merely illustrative, and not restrictive.

For example, while the present application is discussed with respect to systems and methods for providing feedback reminders to enterprise personnel, where the reminders include insight derived from preexisting Enterprise Resource Planning (ERP) software, embodiments are not limited thereto. For example, any learning environment, such as a university, non-profit organization, government, or the Internet in general, may benefit from a system for facilitating reminding users to periodically give and/or request feedback in accordance with embodiments discussed herein.

Furthermore, while embodiments are discussed herein primarily from the perspective of a user that will be providing feedback, embodiments are not limited thereto. For example, various user interface display screens discussed herein may readily be used to configure, generate, and deliver feedback reminders to seek, i.e., to request or ask for feedback.

For the purposes of the present discussion, an enterprise may be any organization of persons, such as a business, university, government, military, and so on. The terms "organization" and "enterprise" are employed interchangeably herein. Personnel of an organization or enterprise, i.e., enterprise personnel, may include any persons associated with the organization, such as employees, contractors, board members, and so on.

ERP software may be any set of computer code that is adapted to facilitate managing resources of an organization. Example resources include Human Resources (HR), financial resources, assets, employees, and so on, of an enterprise. The terms "ERP software" and "ERP application" may be employed interchangeably herein. However, an ERP application may include one or more ERP software modules or components, such as user interface software modules or components.

A talent management system or application may be any software application or functionality for facilitating selecting, organizing, or managing enterprise personnel or tasks performed thereby. Personnel of an organization may include any persons associated with the organization, such as employees, contractors, board members, and so on. Talent management systems, also called personnel management systems herein, may be employed in various applications, including, but not limited to, hiring enterprise personnel, determining compensation, developing capabilities, utilizing capabilities, and constructing, organizing, and managing sales teams and associated tasks.

A Human Capital Management (HCM) system, also called a human resource management system, may be any software that is adapted to facilitate managing enterprise personnel. Certain HCM systems are adapted to facilitate hiring, retaining, using and developing capabilities of enterprise personnel, and so on. Note that various types of systems may include other system. For example certain HCM systems may include talent management systems as components thereof.

For clarity, certain well-known components, such as hard drives, processors, operating systems, power supplies, and so on, have been omitted from the figures. However, those skilled in the art with access to the present teachings will know which components to implement and how to implement them to meet the needs of a given application.

FIG. 1 is a diagram of a first example embodiment of a system 10 for configuring and providing feedback reminders and associated feedback between enterprise personnel. The system 10 includes a talent management system 12 with integrated feedback reminder functionality 14, which communicates with a notes repository 16, an employee profile module 18, and a user interface 24. The user interface 24 may include user interface software, such as Graphical User Interface (GUI) software, and hardware, such as a computer monitor, keyboard, mouse, and so on, for communicating with the talent management system 12 and accompanying feedback reminder functionality 14.

For illustrative purposes, the feedback reminder functionality 14 is shown communicating with additional ERP applications 20. The ERP applications 20 may include, for example, application software 32, which maintains worklists 22. The feedback reminder functionality 14 further communicates with various messaging systems 28, including an email system 30, and an electronic calendar application 26.

For the purposes of the present discussion, a messaging system may be any hardware and/or software that is adapted to facilitate transfer of information or messages, such as feedback or reminders to exchange feedback. Examples of communications systems include email systems, such as Microsoft Outlook, electronic calendars, and applications that include worklists or other listings of tasks to be completed. A worklist may be any listing or collection of information indicating tasks to be performed and/or that have been performed. Hence, the ERP software 20 and accompanying worklists 22 may be considered as comprising a messaging system.

In the present example embodiment, the feedback reminder functionality 14 includes computer code that is integrated with software of the talent management system 12. However, the feedback reminder functionality 14 may be implemented as a module or separate application that communicates with an existing talent management system, without departing from the scope of the present teachings. Furthermore, note that while various modules of the system 10 are shown in separate blocks, which may run on a single computer system, various blocks may be combined or integrated with other blocks or they may be implemented via separate applications running on one or more computers (including mobile computing devices) and/or networks (including wireless networks).

The note repository 16 may be implemented as part of an existing database application, or it may be a stand-alone application, or an application that is integrated with software of the talent management system 12. The note repository 16 may be adapted to selectively store various types of notes, including notes associated with particular feedback reminders, performance development notes, and so on, as discussed more fully below. Exact details as to what types of notes or data can or will be stored in a notes repository are implementation specific and may be varied without departing from the scope of the present teachings. For example, in certain implementations, feedback notes or feedback reminder notes need not be stored in a repository.

For the purposes of the present discussion, a note history may be any listing of previously made notes or indications thereof. A feedback reminder may be any reminder or notification pertaining to a person giving or asking (or that will be giving or asking) for feedback, i.e., initiating a feedback exchange. A feedback exchange may be any transfer of information between entities, such as between a mentor and a mentee, where the information includes input regarding the performance of one or more tasks or goals by one or more of the entities. Information exchanged during a feedback exchange may include input, such as advice, pertaining to a particular task, or may include general advice in view of past performance, goals, aspirations, and so on, of a particular person.

In operation, a user, such as a manager, subordinate employee, mentor, or mentee, may log into the system 10 via the user interface 24. The feedback reminder functionality 14 may be accessed via one or more user interface controls provided via a user interface display screen, such as an employee portrait screen, that is associated with one or more applications of the talent management system 12.

The feedback reminder functionality 14 includes code for facilitating configuring one or more feedback reminders in response to certain user input from the user interface 24, as discussed more fully below. One or more configuration display screens may provide user options for setting reminder patterns, such as by establishing when certain feedback reminders shall be delivered, what insight to include with a feedback reminder, who the feedback reminder pertains to, and so on.

For the purposes of the present discussion, insight may include any background information, such as performance ratings, stated goals, aspirations, knowledge areas, competency gaps, interests, work location, team membership, mentor program status, job title, career statements, and so on, pertaining to a person, such as future or current recipient or provider of feedback.

After a feedback reminder is configured, and any specified insight is retrieved from the employee profile module 18 and/or from other ERP applications 20, the feedback reminder functionality 14 selectively delivers the feedback reminders (according to the configuration) to one or more of the messaging systems 28 and/or to the other ERP applications 20 and accompanying worklists 22. The user interface 24 is then employed to access or open the reminder to view selected insight, which may include user-supplied notes and/or other information.

Note that while the user interface 24 is shown communicating with the talent management system 12, in practice, the user interface 24 may be used to also communicate with the messaging systems 28 and other ERP applications 20. Furthermore, while only one user interface 24 is shown, more user interfaces may be employed.

Note that in certain implementations, insight corresponding to a particular feedback reminder is retrieved, e.g., from the employee profile module 18, when a user opens a feedback reminder message and selects a user interface control therein to trigger retrieval and display of the corresponding feedback. In other implementations, the selected feedback is automatically retrieved and included in the feedback reminder message. Whether insight is embedded in a reminder message or retrieved via functionality provided therein is implementation specific. Those skilled in the art with access to the present teachings may readily determine and implement such details to meet the needs of a given implementation without undue experimentation.

In an example operative scenario, additional feedback functionality is included in feedback reminder messages. In particular, a reminder message may be adapted so that when a user replies to a feedback reminder message, contents of the reply message are sent to a specified recipient of feedback. Contents of the reply message may include relevant feedback. The specified recipient(s) may include one or more persons selected during configuration of the feedback reminder. Contents of the feedback reply message may also be lodged in the notes repository 16 in association with the feedback reminder that is being replied too. In addition, a signal may be forwarded to an application whereby an administrator or other authorized personnel may monitor whether a particular user has provided feedback or has requested feedback in accordance with a predetermined enterprise policy or assigned task list.

In an alternative example operative scenario, a user employs the user interface 24 to configure the feedback reminder functionality 14 to trigger a user reminder to provide feedback or to ask for feedback (from/to another worker or employee) after completion of a particular goal or task or after a predetermined percentage completion of a particular goal or task. The feedback reminder functionality 14 includes computer code for selectively communicating with one or more applications of the application software 32. For illustrative purposes, the application software 32 is shown including the worklist 22, a project/goal tracking application 34, a social network application 36 for facilitating communications between employee project/goal teams, and a performance evaluation document 38 for characterizing employee performance over a particular time interval, e.g., bi-annual or annual.

The completion status of a particular goal that is to be associated with a particular feedback reminder may be established or otherwise tracked via the project/goal tracking application 34, as discussed more fully below.

Upon configuring a particular feedback reminder to trigger upon a predetermined goal-completion status, code running on the feedback reminder functionality module 14 monitors the completion status of a specified goal by referencing the goal-completion status maintained via the project/goal tracking application 34. Upon detection of the goal reaching the specified completion status, the feedback reminder functionality 14 triggers a reminder to the user to give or ask for feedback in accordance with the preconfigured reminder. The reminder is user configurable to automatically remind the user to give or ask for feedback to/from employee team members working on a particular goal (associated with the reminder) or otherwise associated with a project associated with the particular goal that is associated with the feedback reminder.

The resulting reminder, called a goal-triggered reminder, may be displayed via one or more applications and accompanying user interfaces, such as the example user interface 24, an email or messaging application of the messaging systems 28, the social network application 36, and so on. Exactly where a particular reminder occurs in a particular suite of applications is implementation specific and may vary depending upon the needs of a particular implementation.

The various applications of the application software 32 may be implemented via a single application or separate applications, without departing from the scope of the present teachings. Furthermore, pre-existing ERP software, such as project management software, may be readily modified by those skilled in the art with access to the present teachings to meet the needs of a particular implementation of an embodiment discussed herein, without undue experimentation.

When a goal-triggered reminder is delivered to a user, and the user responds with particular feedback, the resulting feedback may be transferred via the feedback reminder functionality 14 to one or more of the messaging systems 28 and software applications 20. In the present example operative scenario, resulting feedback is displayed via the project/goal tracking application 34 in association with (e.g., in visual proximity to or otherwise adjacent to) the particular goal associated with the goal-triggered reminder, and the goal-triggered feedback is displayed in association with the particular goal, which is described in the performance evaluation document 38.

In summary, in the present operative scenario, upon completion of a goal or completion of a particular percentage of a goal or task, the feedback reminder functionality 14 may automatically trigger a user option for a user (e.g., particular employee) to request or give feedback from/to specified persons (e.g., employees, managers, etc.) pertaining to the goal.

If a Group Space (e.g., collaboration workspace associated with a group or team of employees) is linked to the goal, e.g., via the project/goal tracking application 34 and/or social network application 36, then the feedback reminder functionality 14 may automatically suggest the people in the group as people to provide feedback to or request feedback from.

When a user responds to a goal-triggered feedback reminder by providing feedback, the feedback may appear in a user interface display screen next to (in the context of) the goal, which may facilitate easy access to the feedback. The feedback may automatically be associated with the goal when the goal is included in the performance evaluation document 38. Hence, the goal-triggered feedback may be referenced by the user in a document user interface used to view the performance evaluation document 38.

Hence, goal-triggered feedback tends to be relevant to specific goals, which may be identified in the performance evaluation document(s) 38 along with the feedback, thereby providing a convenient reference for an employee or manager when evaluating the goal at the end of a performance evaluation cycle (e.g., at the end of the year). Goal-triggered feedback responses may be immediately visible in a goal management user interface (e.g., as may be implemented via the project/goal tracking application 34) in the context of the specific goals for easy user reference.

An example method for facilitating goal-triggered feedback reminders via the system 10 of FIG. 1 includes providing a user option to trigger a feedback reminder based on a completion status of a specified goal or task; monitoring goal-completion status in response to goal-completion status updates provided by users or provided automatically, and providing a signal in response thereto; selectively triggering display of or delivery of the feedback reminder in response to the signal.

In a more specific embodiment, the method further includes automatically suggesting to a user that feedback be given to or asked from group members (e.g., team members) associated with a specified goal associated with the feedback reminder; and displaying feedback given or received in response to the feedback reminder, in proximity to an identification of a goal in a performance evaluation document, group space user interface display screen, or goal management user interface display screen.

Hence, the present goal-triggered feedback system and method may reduce instances whereby feedback provided in a performance evaluation document is irrelevant, incomplete, or otherwise based only upon recent employee performance.

Figure 2:
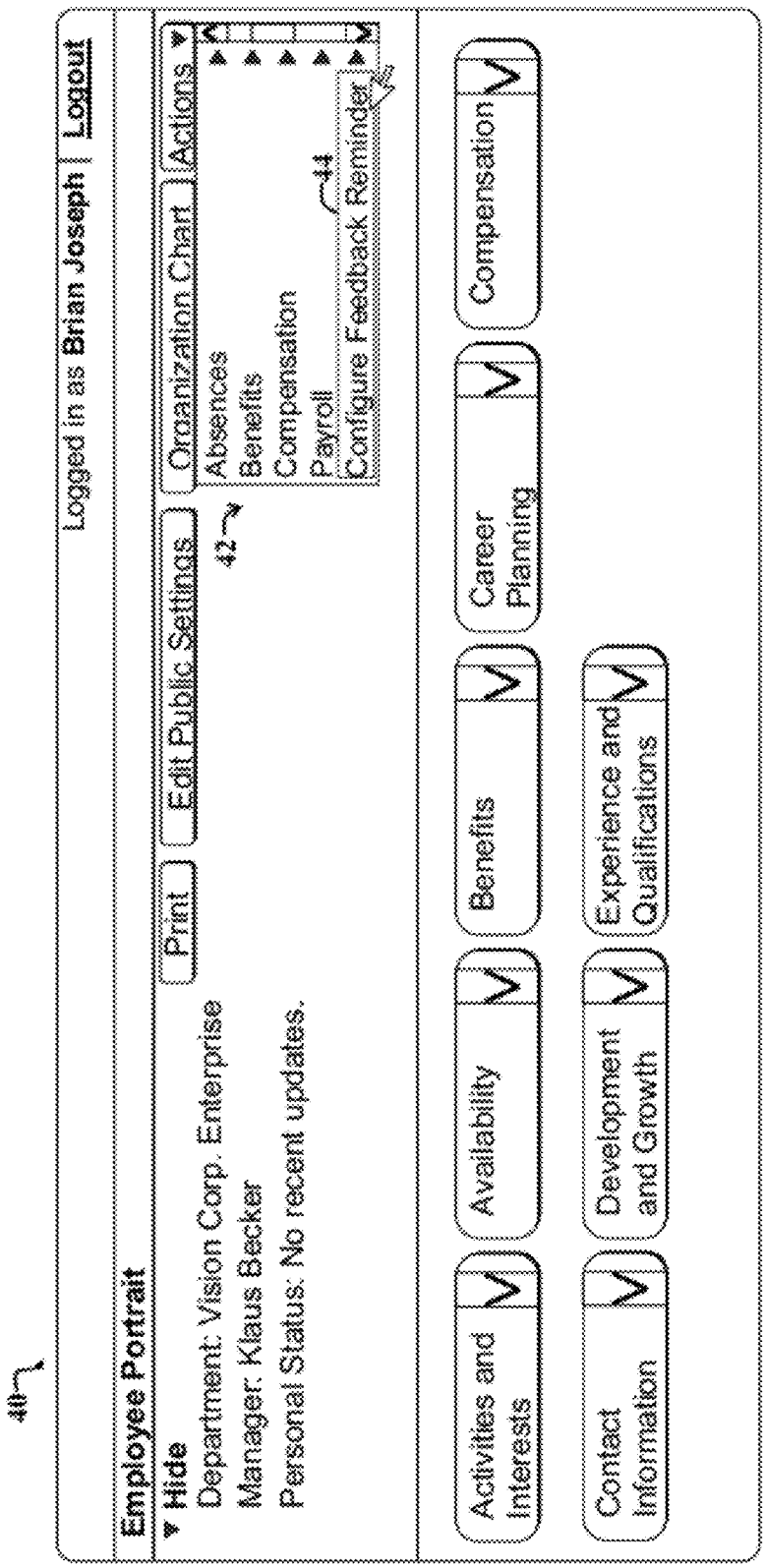
FIG. 2 is a diagram of a first example user interface display screen of an Enterprise Resource Planning (ERP) application, whereby a user may access feedback reminder functionality provided by the system of FIG. 1.

FIG. 2 is a diagram of a first example user interface display screen 40 of an Enterprise Resource Planning (ERP) application, such as the talent management system 12 of FIG. 1, whereby a user may access feedback reminder functionality 14 provided therein.

The example user interface display screen 40 represents an employee portrait, which consolidates information and access to functionality associated with an employee or other enterprise personnel. The employee portrait 40 includes an actions drop down menu 42 with a feedback-reminder user option 44.

Selection of the feedback-reminder user option 44 activates underlying computer code corresponding to the feedback reminder functionality 14 of FIG. 1. In the present example embodiment, selection of the feedback-reminder user option 44 triggers display of a configuration screen, as discussed more fully below with reference to FIG. 3.

Note that the employee portrait 40 may include additional user interface controls for accessing feedback reminder functionality, without departing from the scope of the present teachings. For example, an additional control for enabling viewing existing feedback reminders, modifying or deleting existing feedback reminders, adding new feedback reminders, reviewing associated notes, and so on, may be provided in the employee portrait 40.

Figure 3:
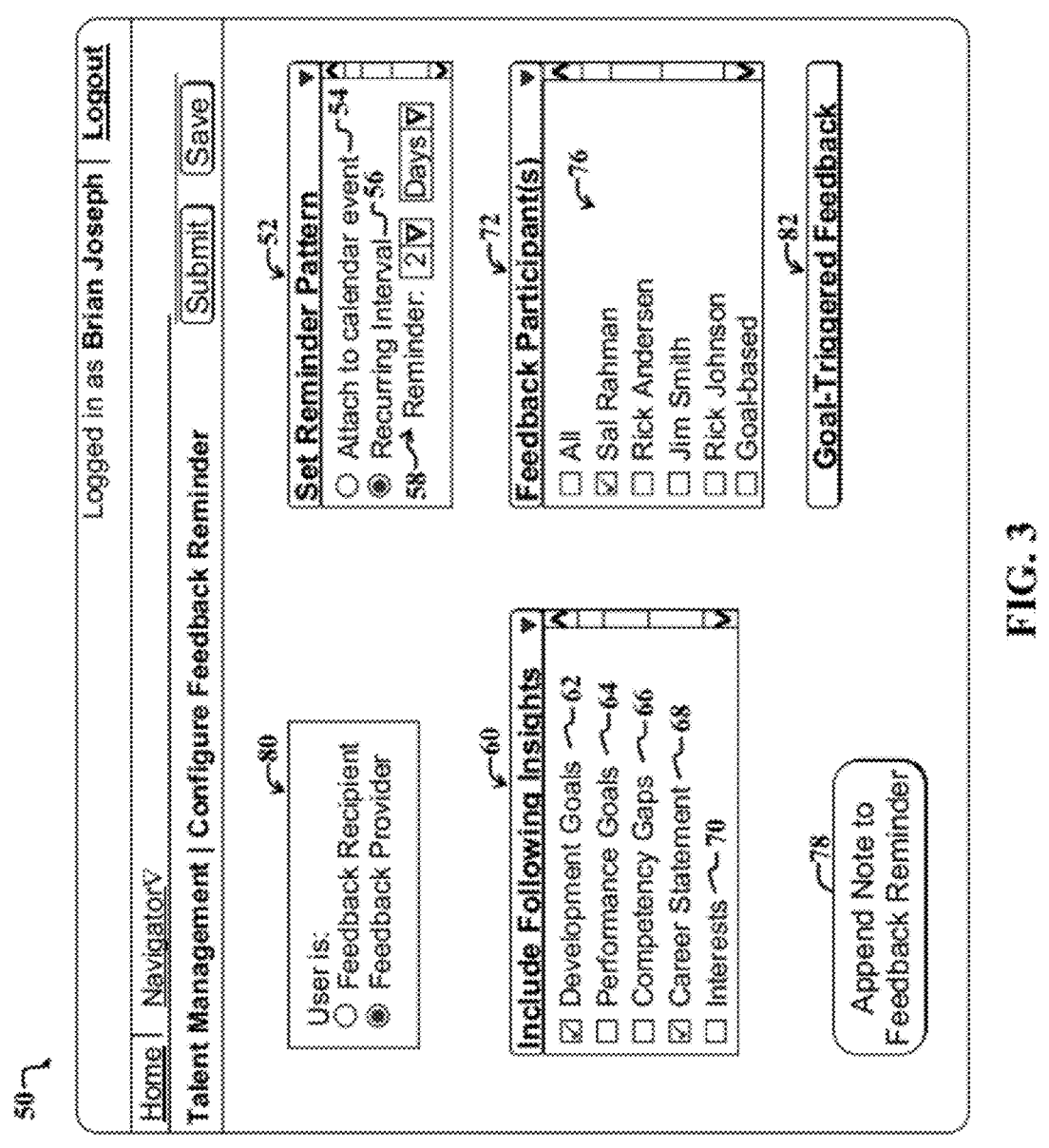

FIG. 3 is a diagram of a second example of user interface display screen 50 (which is accessible via the user interface display screen 40 of FIG. 2), for configuring a feedback reminder.

The second example user interface display screen 50 includes a reminder pattern section 52, with user interface controls 54-58 for establishing when feedback reminders associated with the current configuration are delivered to one or more messaging systems. For example, a first radio button 54 is adapted to trigger display of a dialog box or page with options for associating one or more reminders with one or more events listed via an electronic calendar in response to user selection of the first radio button 54. Selection of a second radio button 56 enables a user to enter a time period, e.g., every X days, for which to generate an associated feedback reminder based on a selected recurring interval.

The user interface display screen 50 further includes an insight section 60. The insight section 60 includes various user interface controls 62-70, i.e., check boxes, corresponding to various types of insight, including stated development goals 62, stated performance goals 64, specification of a predetermined competence or incompetence 66, content of a career statement(s) 68, and specified interest(s) 70. Additional or different types of insights than those shown may be provided without departing from the scope of the present teachings. In general, exact types of insights that may be retrieved in association with a feedback reminder are implementation specific and may vary. A user may select one or more of the insights 62-70, which will be included in or otherwise linked to associated feedback reminder messages.

A feedback-exchange participant section 72 provides various user options 76 for enabling a user to select persons to associate with a particular feedback reminder. In the present implementation, persons selected via the feedback-exchange participant section 72 represent either persons to receive feedback from the user or persons from which the user is to receive feedback in response to user receipt of an associated feedback reminder message.

An optional note button 78 is adapted to trigger display of a dialog box, window, or page, whereby a user may specify a note to be included in, or otherwise associated with, feedback reminders generated based on the configuration established via the various user interface controls of the second example display screen 50.

Additional radio buttons 80 enable a user to specify whether the user configuring the feedback reminders is a feedback recipient or a feedback provider. The list of insights 60 may be adjusted based on whether the user is a feedback recipient or provider. Furthermore, language of feedback reminders may be adjusted accordingly, such as to remind the user to give feedback or to remind a user to ask for feedback.

User selection of a goal-triggered feedback button 82 results in activation of a subsequent display screen (not shown), whereby a user may select goals for which to configure goal-triggered feedback reminders. Example configuration user options include an option for setting a goal completion status level (e.g., 100%) for triggering display or delivery of the goal-triggered feedback reminder; a user option to select feedback participants, and so on, as discussed more fully below.

In the present example embodiment, the display screen activated in response to selection of the goal-triggered feedback button 82 may include user interface controls for enabling the feedback provider (as indicated by the radio buttons 80) to select one or more goals for the selected participant(s), which in this case is Sal Rahman (as indicated by the selected check box 76). The additional display screen may provide additional user options for adding or modifying Sal Rahman's goals. When the feedback provider has configured one or more of Sal Rahman's goals for goal-triggered feedback reminders, then when one or more of his goals reaches a predetermined completion status, a goal-triggered feedback reminder is sent to the feedback provider reminding the feedback provider to provide Sal Rahman feedback in accordance with the reminder.

Note that while, in the present example embodiment, the user is indicated as being the feedback provider, in practice, issuance of goal-triggered feedback reminders may be particularly useful for feedback recipients who wish to ask for feedback from others after a goal or task reaches a predetermined completion status.

Note that while a goal-triggered feedback button 82 for accessing feedback reminder configuration options is provided in the configuration user interface display screen 50, such functionality may be provided in different user interface display screens, which may be accessible in various ways via various software applications that may employ feedback reminder functionality discussed herein. For example, project management software or goal management software may be modified to provide user interface options for selecting and configuring goal-triggered feedback reminders. Such user options may be displayed proximate to user interface options for accessing information pertaining to various goals or tasks.

FIG. 4 is a diagram of a third example user interface display screen 90 for receiving a feedback reminder notification 92 via a worklist 94. The worklist 94 may be implemented via an ERP application, such as application 32 of FIG. 1.

The worklist 94 provides a listing of tasks to be done by the user who has logged into the associated application. While in the present embodiment, a feedback title, number, priority level, user name, and state information associated with the feedback reminder indication 92 are shown, more or less information may be shown in the list 94, without departing from the scope of the present teachings.

For example, in certain implementations, an indication as to whether feedback associated with the reminder indication 92 has been performed may also be displayed. Exact details for tracking or otherwise determining whether an underlying action, such as providing feedback, has been performed are implementation specific and may vary.

In one embodiment, a message associated with the feedback reminder indication 92 may be accessed by double-clicking the feedback reminder indication 92. The resulting displayed reminder message may include an option for replying to the message. The resulting reply message may represent feedback, which is delivered to a feedback recipient, such as Sal Rahman. Additional functionality for adjusting a status of the feedback reminder indication 92 may be included in the displayed reminder message. For example, the additional functionality may include computer code for updating a status of the feedback reminder indication 92 to, e.g., "feedback completed" in response to the sending of a reply message in response to the associated feedback reminder message, which is accessible via the feedback reminder indication 92.

Figure 5:
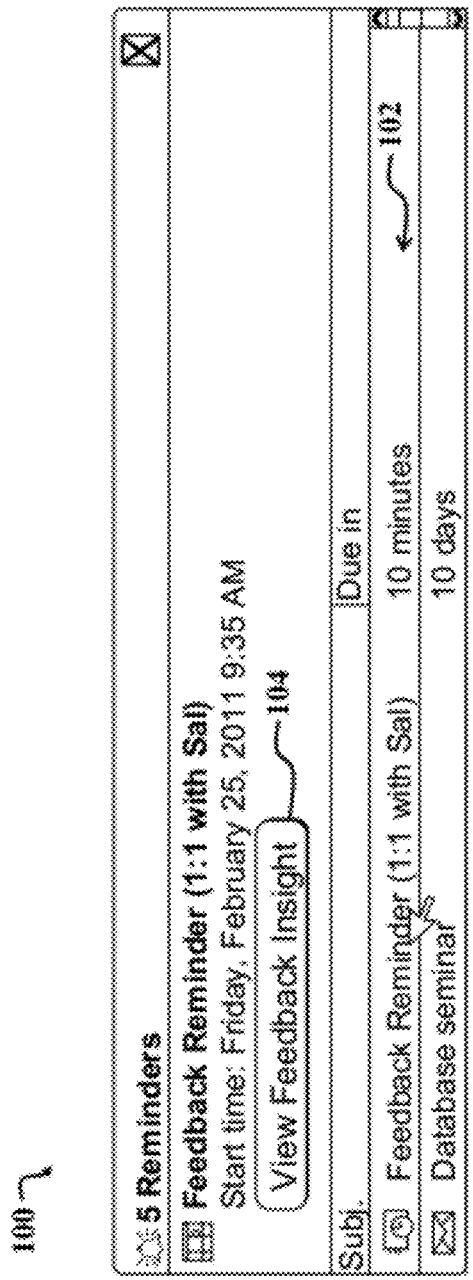
FIG. 5 is a diagram of a fourth example user interface display screen for receiving a feedback reminder via a calendar reminder mechanism.

FIG. 5 is a diagram of a fourth example user interface display screen 100 for receiving a feedback reminder indication 102 via a calendar reminder mechanism. The fourth example user interface display screen 100, which represents a calendar reminder dialog box or window, includes a view-feedback-insight user interface control, i.e., button 104, which may appear in response to user selection of the feedback reminder indication 102. Additional information indicating that the feedback is to comprise 1-on-1 meeting with Sal on a specified date is also displayed in proximity to the view-feedback user interface control 104.

In general, in the present example embodiment, contents of a feedback reminder message associated with a particular feedback reminder indication 102 appear in an upper portion of the user interface display screen 100 in response to user selection of the associated feedback reminder indication 102. The feedback reminder indication 102 may be displayed in association with additional information, such as when the feedback exchange is to occur. In the present example embodiment, the feedback exchange is to occur in ten minutes.

Additional user options, such as options to view notes; to view a history of notes or a listing of indications thereof; to automatically delay a reminder or generate a new reminder based on the reminder, and so on, may be provided in the user interface display screen 100, without departing from the scope of the present teachings. In addition, instead of displaying the view-feedback-insight button 104, the insight may be automatically displayed via the user interface display screen 100, without departing from the scope of the present teachings.

Figure 6:
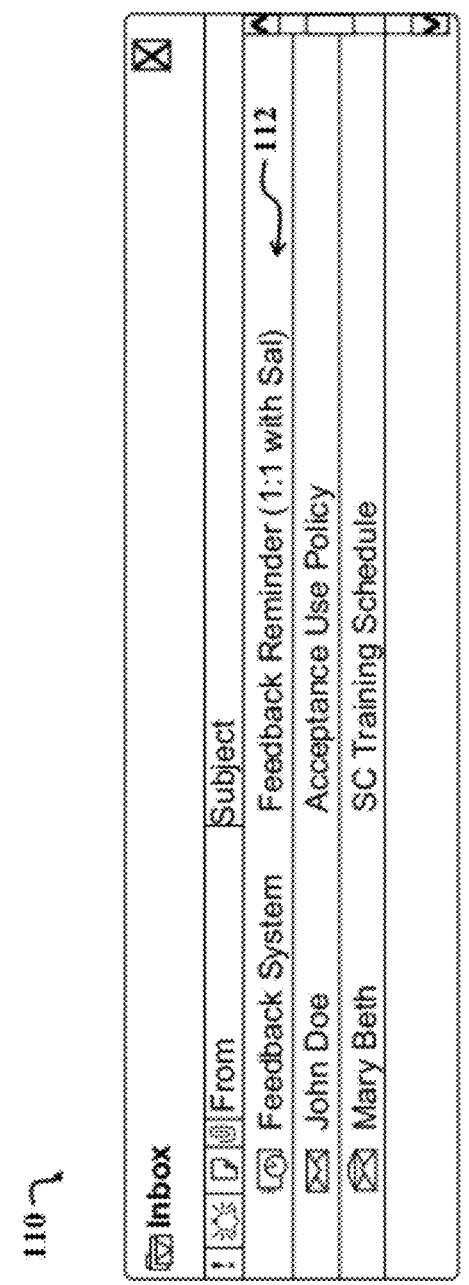
FIG. 6 is a diagram of a fifth example user interface display screen for receiving a feedback reminder via an email inbox.

FIG. 6 is a diagram of a fifth example user interface display screen 110, which represents an email inbox with a feedback reminder indication 112. The inbox 110 lists received email messages, including the example feedback reminder indication 112, which reminds the user to provide feedback to Sal Rahman. Note that Sal Rahman corresponds to a feedback-exchange participant selected via the configuration user interface 50 of FIG. 3.

The feedback reminder indication 112, i.e., email indication, is identified via a from field indicating that the reminder was generated by a feedback system, e.g., the feedback functionality 14 of FIG. 1. A subject field indicates that the reminder pertains to a forthcoming 1-on-1 meeting with Sal during, before, or after which feedback is to be given to Sal.

FIG. 7 is a diagram of a seventh example user interface display screen 120, which illustrates example contents of a feedback reminder with an option 130 to view feedback insight details. The example user interface display screen 120 represents a feedback reminder, which includes a details section 122. The details section 122 provides information, such as who is to provide feedback, when the feedback is to occur or when the task of providing feedback was assigned, and a task number associated with the task of providing feedback. Task information and/or accompanying worklists may be used to facilitate tracking feedback exchanges as tasks.

An actions section includes a delay-feedback user option 124. The delay-feedback user option 124 is employed to selectively delay the feedback reminder by a predetermined interval. A first feedback reminder is said to be delayed when a new second feedback reminder message with similar content (other than the date and/or time to provide feedback) as the first feedback reminder is generated for future delivery. The time at which the second feedback reminder message will be sent to one or more messaging systems is determined based on the delay selected by the delay-feedback user option 124.

A feedback insight section indicates previously selected insight 126 for informing subsequent feedback associated with the feedback reminder represented by the seventh example user interface display screen 120. The previously selected insight 126 was established, i.e., chosen, during configuration of the feedback reminder 120, e.g., via the configuration user interface display screen 50 of FIG. 3.

In the present example embodiment, the feedback includes a career statement and development goals. To view the career statement and description(s) of development goals, a link 130 is provided. Alternatively, the career statement and description(s) of development goals may be included among the indications of previously selected insight 126.

An optional reply button 132 represents a user option to reply to the feedback reminder 120. Selection of the reply button 132 may trigger display of a dialog box or window with fields for entering text, attaching documents, and so on, which may constitute feedback.

FIG. 8 is a diagram of an eighth example user interface display screen 130 illustrating example feedback insight details associated with a feedback reminder, such as the reminder 120 of FIG. 7. Feedback insight details include an indication 134 of the feedback recipient (which in this case is Sal Rahman), a career statement 136, and a listing of indications of development goals 138. Each of the indications of development goals 138 may be selected to view additional details, if any, associated with each indication.

A notes button 132 represents a user option to add a note in association with the feedback reminder that is used to access the feedback-insight display screen 130. Selection of the notes button 132 may trigger display of one or more user interface mechanisms for entering and saving a note.

Note that additional user interface controls may be provided via the feedback-insight user interface display screen 130, without departing from the scope of the present teachings. For example, a button for viewing a history of notes, as maintained by the notes repository 16 of FIG. 1, may be provided. Alternatively, a user interface display screen appearing after selection of the notes button 132 may include a user interface control for viewing a history of notes made pertaining to the ongoing feedback reminders pertaining to Sal Rahman.

Figure 9:
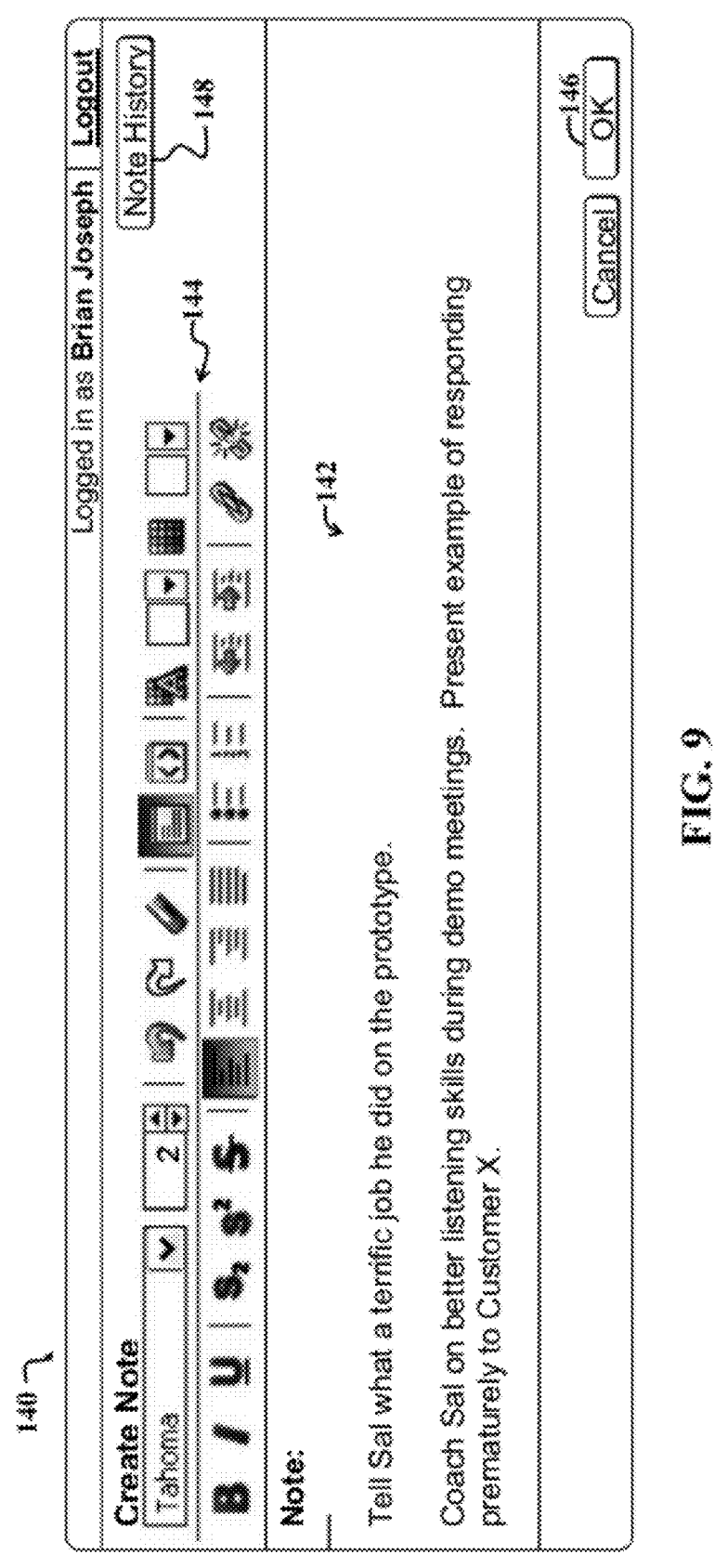

FIG. 9 is diagram of a ninth example user interface display screen 140 illustrating an example field 142 and accompanying controls 144 for entering a note. The user interface display screen 140 may be displayed in response to user selection of the note button 132 of FIG. 8.

After entering a note and selecting an OK button 146, the corresponding note is stored in memory (such as via the notes repository 16 of FIG. 1) and becomes part of a history of notes. The note history associated with a particular feedback reminder or set of recurring feedback reminders associated with a particular configuration, is accessible in response to user selection of a notes history button 148.

Note that different or additional mechanisms (other than the notes history button 148), such as different user interface controls provided in different display screens, may be employed to initiate triggering display of a note history, without departing from the scope of the present teachings.

FIG. 10 is a diagram of a tenth example user interface display screen 150 illustrating an example note history 152, which may be accessible via the user interface display screens of FIGS. 8 and 9. For example, user selection of the notes history button 146 of FIG. 9 may trigger display of the user interface display screen 150.

The user interface display screen 150 includes a listing of all notes associated with a particular person and/or particular feedback reminder or set of recurring feedback reminders associated with a particular configuration. The particular configuration may be established via the configuration user interface display screen 50 of FIG. 3.

Note that various user interface controls for implementing various additional features, such as sorting of notes, searching for notes with particular content, and so on, may be implemented in the tenth example user interface display screen 150. Exact details pertaining to user interface controls and access to associated functionality may vary depending upon the implementation. Those skilled in the art may readily determine and implement such details to meet the needs of a given implementation without undue experimentation.

Figure 11:
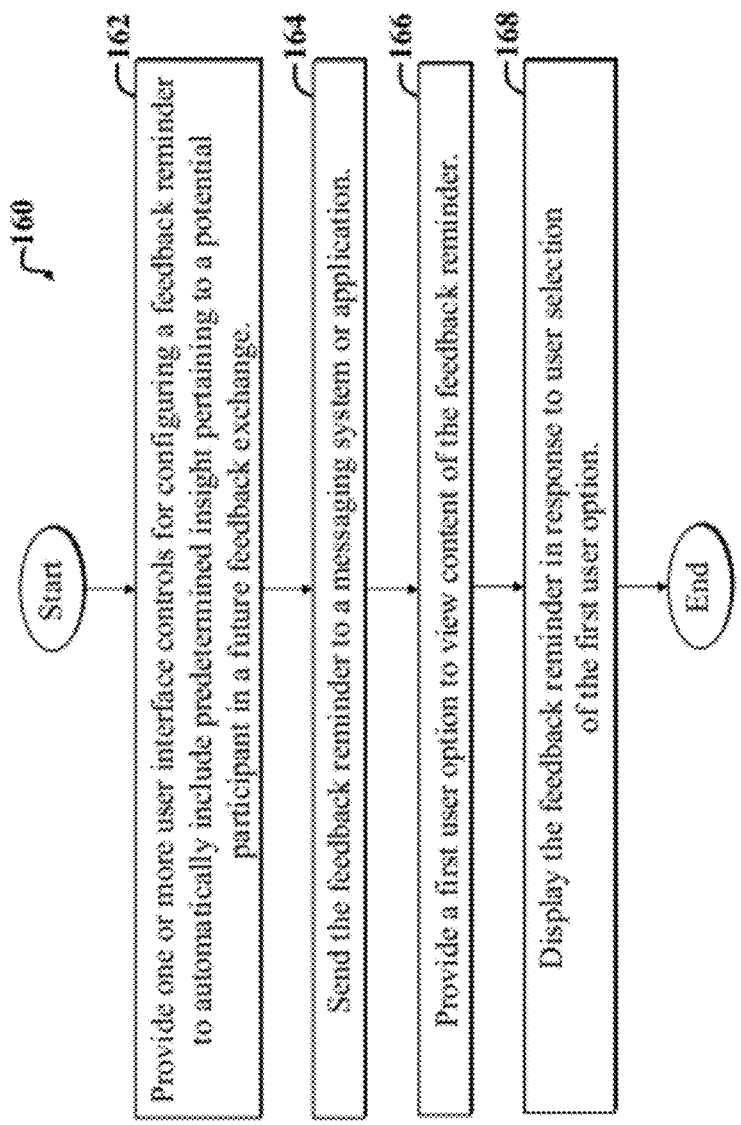
FIG. 11 is a flow diagram of a first example method adapted for use with the embodiments of FIGS. 1-10.

FIG. 11 is a flow diagram of a first example method 160 adapted for use with the embodiments of FIGS. 1-10. The first example method 160 includes a first step 162, which includes providing one or more user interface controls to configure a feedback reminder to automatically include predetermined insight pertaining to a potential participant in a future feedback exchange. Such user interface controls may be provided via the configuration user interface 50 of FIG. 3.

A second step 164 includes sending the feedback reminder to a messaging system or application, such as the messaging systems 28 and/or ERP applications 20 and associated worklist(s) 22 of FIG. 1

A third step 166 includes providing a first user option to view content of the feedback reminder.

A fourth step 168 includes displaying the feedback reminder in response to user selection of the first user option.

Figure 12:
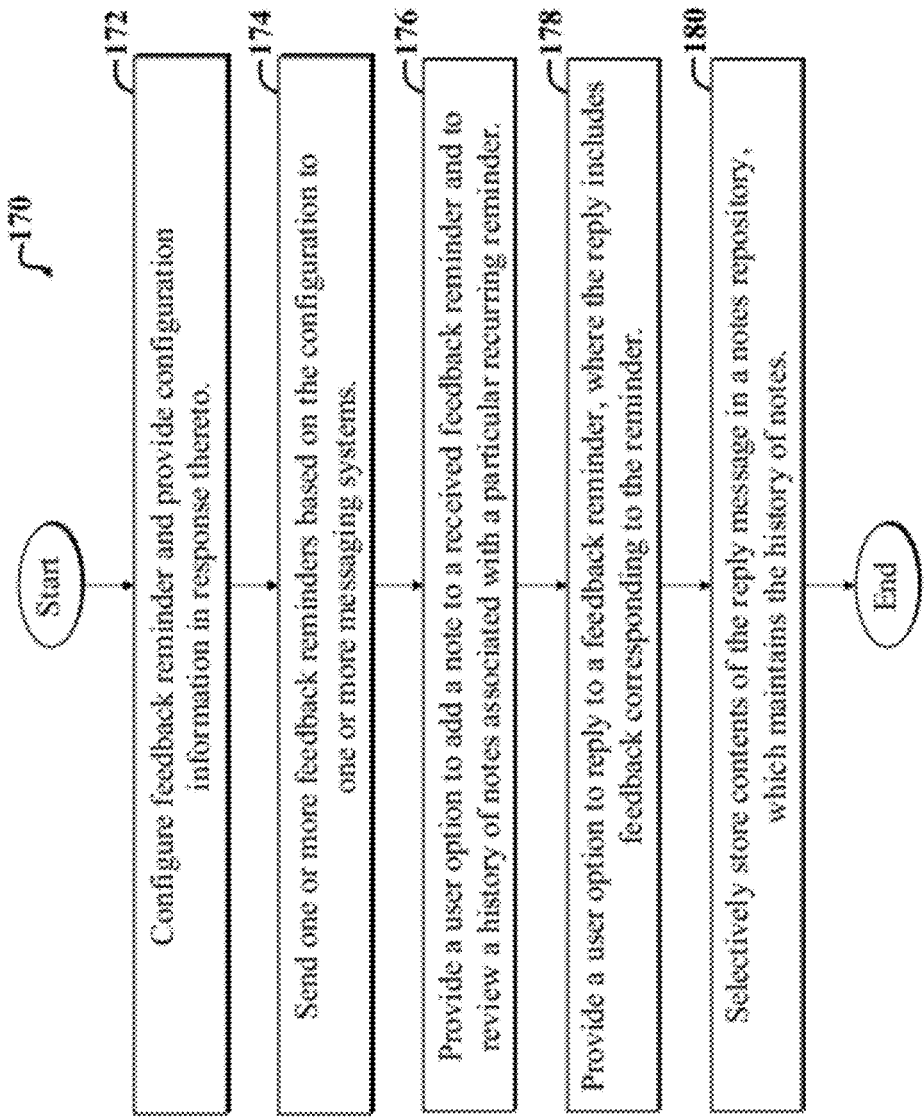
FIG. 12 is a flow diagram of a second example method adapted for use with the embodiments of FIGS. 1-10.

FIG. 12 is a flow diagram of a second example method 170 adapted for use with the embodiments of FIGS. 1-10. The second example method 170 includes an initial configuring step 172, which involves configuring a feedback reminder, such as by specifying how frequently the reminder is delivered to a messaging system, what insight to include along with the feedback reminder, who to associate with the feedback reminder, and so on.

Subsequently, a sending step 174 includes sending one or more reminders based on the feedback reminder configuration to one or more messaging systems.

Next, a note-taking step 176 includes providing a user option to add a note to a received reminder and to review a history of notes associated with a particular recurring reminder.

Subsequently, an optional reminder-replying step 178 includes providing a user option to reply to a feedback reminder, where the reply includes or constitutes feedback corresponding to the reminder.

Next, an optional storing step 180 includes storing contents of the reply message in a notes repository, which maintains a history of notes associated with a configured feedback reminder.

Note that various steps of the methods 160, 170 of FIGS. 11 and 12 may be omitted, rearranged, or steps may be added without departing from the scope of the present teachings. For example, the methods 170 may include an additional step involving providing an additional user option to retrieve insight from a talent management application or other application pertaining to a feedback recipient or future feedback recipient or pertaining to a person from whom feedback is requested or will be requested.

Figure 13:
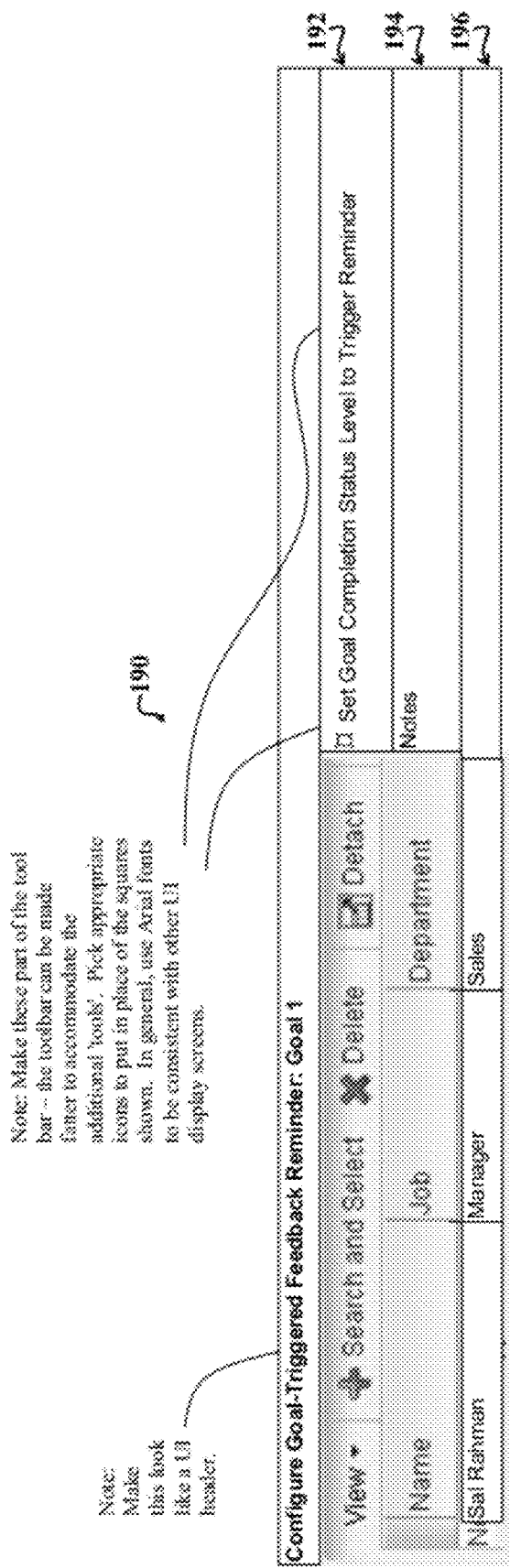
FIG. 13 is a diagram of an eleventh example user interface display screen, which may be displayed in response to selection of a goal for goal-triggered feedback in the user interface display screen of FIG. 3.

FIG. 13 is a diagram of an eleventh example user interface display screen 190, which may be displayed in response to selection of the goal-triggered feedback button 82 in the user interface display screen 50 of FIG. 3. Note that other user interface mechanisms (e.g., other than those shown in FIG. 3) may be employed to activate the display screen 190 of FIG. 13, without departing from the scope of the present teachings.

The eleventh example user interface display screen 190 is adapted to facilitate configuring a goal-triggered feedback reminder and includes a tool bar 192 above a list of selected feedback participants 196, which is organized by name, job, department, and notes, as shown in a table header 194.

Tools of the tool bar 192 provide various user options, such as a user option to search and select additional feedback participants, a user option to delete a listed and selected feedback participant from the listing 196, a user option to set a goal completion status level to trigger a reminder, and a user option to have the underlying feedback reminder functionality automatically select feedback participants.

User selection of the option (from the toolbar 192) to set goal completion status level for triggering the feedback reminder may result in display of an additional display screen or dialog box, whereby a user may specify, for example, that after a goal is 90 percent complete, a reminder to provide or ask for feedback to or from the listed participants 196 is to be displayed, emailed, or otherwise made visible to a user of a feedback system in accordance with an implementation of an embodiment disclosed herein.

By default, the list 196 is auto-populated with feedback participants based on a preselected goal (e.g., Goal 1). For example, the participants may be group members (also called team members) working on the specified goal (Goal 1) or otherwise working on a project of which the specified goal is a part.

With reference to FIGS. 3 and 13, in the present example embodiment, the user is a feedback provider, and Sal Rahman is a feedback recipient. Note however, that in practice, the user will often be the feedback recipient, and the list 196 will typically include a list of feedback providers from which a user (feedback recipient) will be requesting feedback when one or more of the user's goals reach a specified completion status.

Any resulting feedback (given or provided in response to a feedback reminder) may be lodged in a performance evaluation document (or otherwise linked thereto) in association with the specified goal. Furthermore, any resulting feedback content (or links thereto) may appear in goal management user interfaces, group spaces, and so on, in association with the specified goal.

Figure 14:
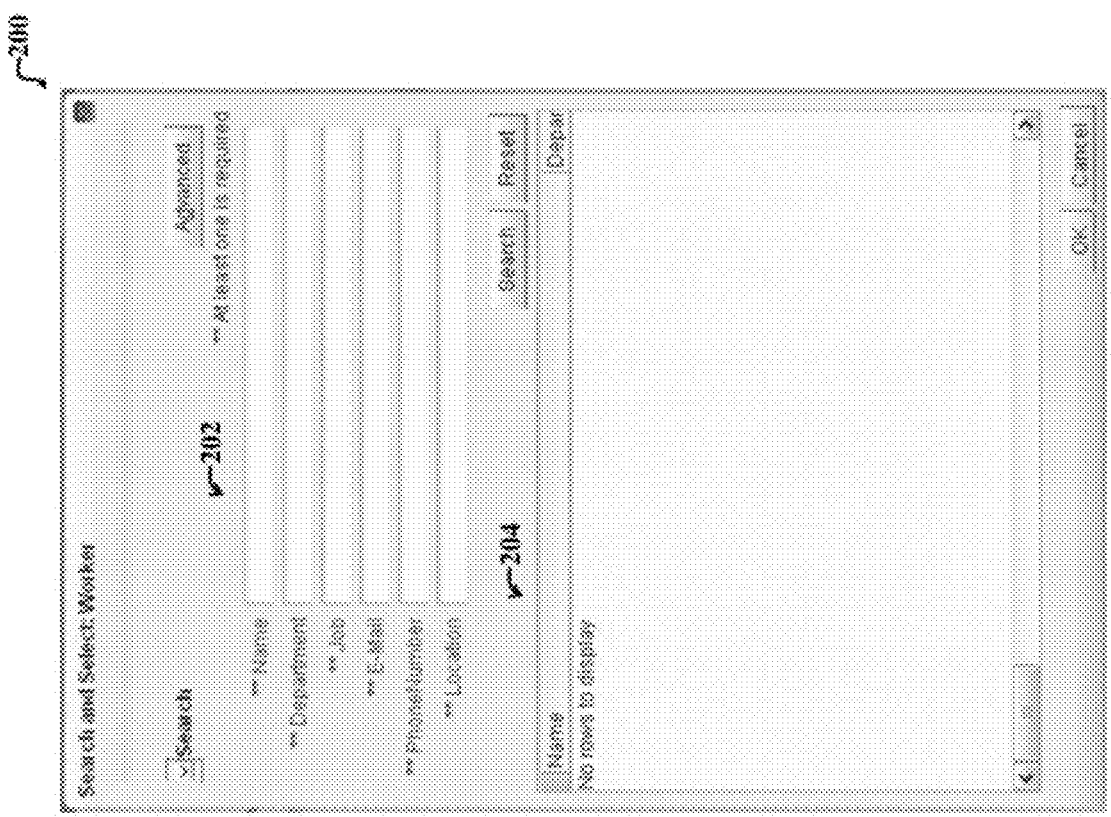
FIG. 14 is a diagram of a twelfth example user interface display screen, which may be displayed in response to selection of a search button from the user interface display screen of FIG. 13.

FIG. 14 is a diagram of a twelfth example user interface display screen 200, which may be displayed in response to selection of a search button from to toolbar 192 of the user interface display screen 190 of FIG. 13. The twelfth example user interface display screen 200 includes a set of query fields 202, which provide fields for entering a feedback participant's name, department, job, email, phone number, and location. Additional fields may be provided in response to selection of an advanced search user option. The various fields 202 represent user interface controls whereby a user may enter search criteria (also called query data).

Upon selection of a search button, feedback reminder functionality (e.g., functionality 14 of FIG. 1) activates search code contained therein for searching one or more databases (e.g., ERP applications 20 of FIG. 1) for employees or other persons matching the search criteria specified in the fields 202. The search code returns any results, which are displayed, i.e., described in a search results section 204. One or more returned results may be selected, and an Ok button may then be pressed. Pressing of the Ok button may cause automatic inclusion of the selected feedback participants in the listing 196 of FIG. 13, and may further cause the user interface display screen 200 to close, thereby revealing the eleventh example user interface display screen 190 of FIG. 13.

Figure 15:
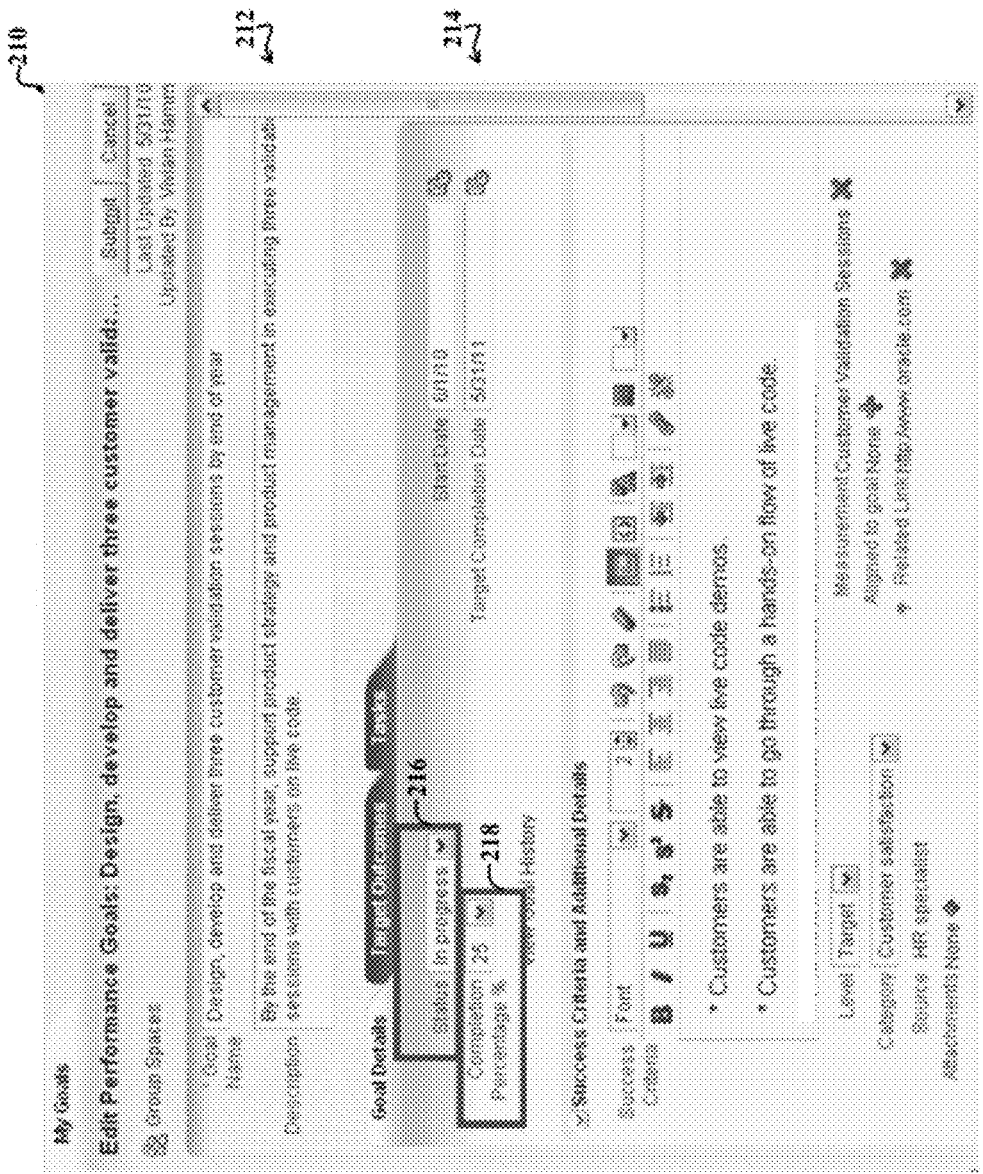
FIG. 15 is a diagram of a thirteenth example user interface display screen via which goal-completion status may be set.

FIG. 15 is a diagram of a thirteenth example user interface display screen 210 via which goal-completion status may be set. The thirteenth example user interface display screen 210 includes a goal-identification section 212, which identifies and/or describes a particular goal. A goal completion status section 214 includes various fields 216, 218 for setting goal completion status. In the present example embodiment, a status user interface control 216 provides a user option to set a status of a particular goal, e.g., in progress, completed, canceled, and so on. A completion percentage user interface control 218 provides a user option to specify a goal completion percentage, e.g. 25%, 50%, and so on. Note that while a drop-down list 218 is provided to facilitate user selection of a goal completion status, a user may type in the adjacent field to specify a percentage completion that is not provided in the drop-down list 218.

Establishment of or selection the goal percentage completion status via the user interface control 218 may cause a signal to be forwarded to the feedback reminder functionality 14 of FIG. 1. The feedback reminder functionality 14 then determines if the goal completion status is sufficient to trigger a reminder based on any preconfigured goal-triggered feedback reminders.

Figure 16:
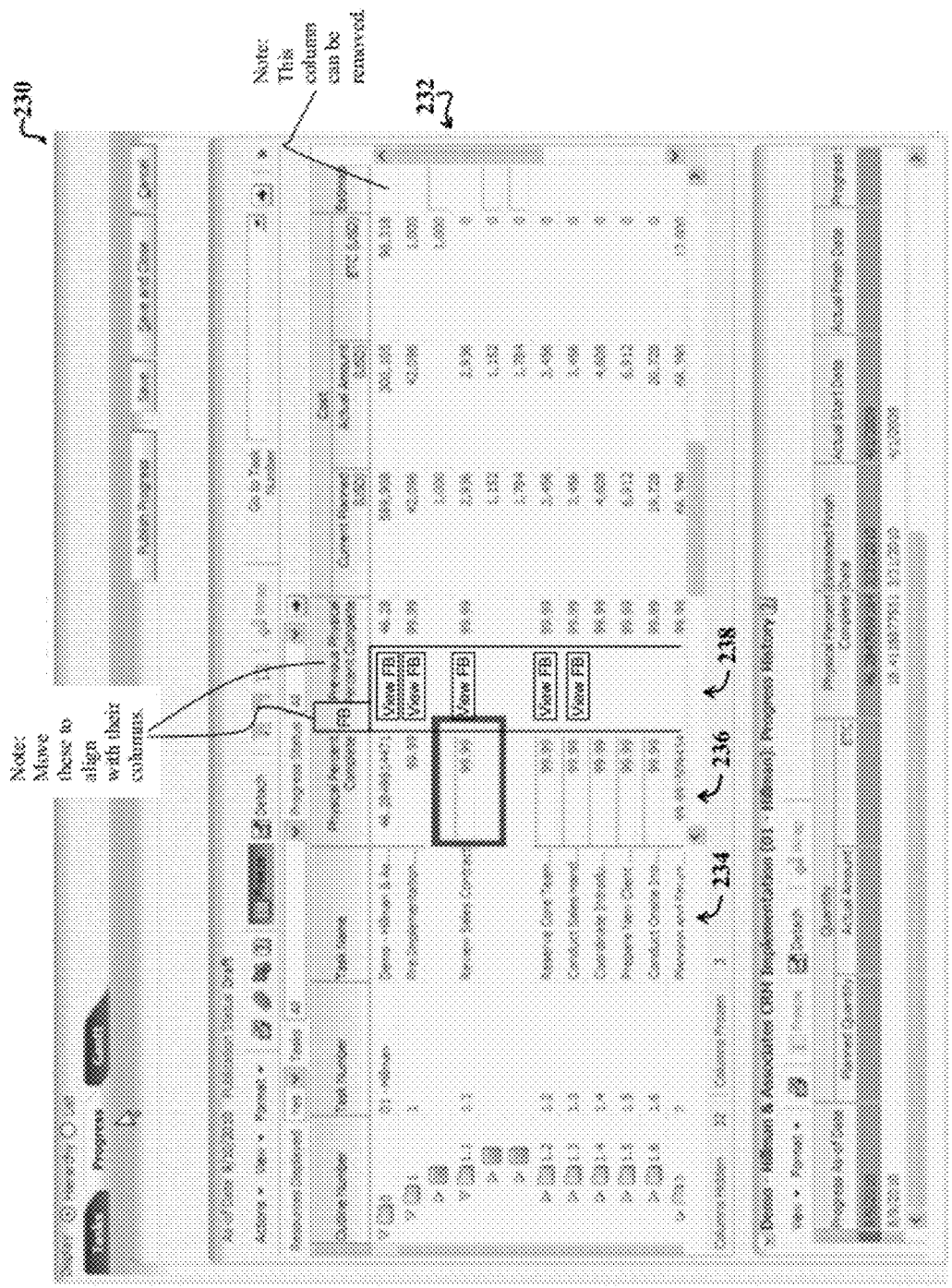
FIG. 16 is a diagram of a fourteenth example user interface display screen, which lists various tasks in association with percentage complete, and which provides user options to view feedback associated with each listed task.

FIG. 16 is a diagram of a fourteenth example user interface display screen 230, which lists various tasks 234 in association with percentage complete 236, and which provides user options 238 to view feedback associated with each listed task. The fourteenth example user interface display screen 230 includes a task section 232, which provides a table listing various tasks (also called goals, as discussed more fully below), as indicated in a task name column 234.

Note that while in the specific example embodiment of FIG. 16, options to view feedback associated with various tasks are shown, those skilled in the art will appreciate that different user interface display screens, e.g., goal management user interfaces, may be adapted to integrate display of goal information and options to view feedback information associated with the goals without departing from the scope of the present teachings. Furthermore, while a column of user interface controls 238 provides access to feedback that is associated with each task, other user interface mechanisms (e.g., right-click menu options, menu options, different user interface display screens, and so on) may be employed to view feedback associated with a particular task or goal.

For the purposes of the present discussion, a goal may be any targeted or sought result that involves completion of one or more actions or activities, called tasks, sub-tasks, or sub-goals. A task may be any activity or collection of activities targeted for completion. Completion of a given task may be considered completion of a goal (where the goal is to complete the task), and completion of several sub-tasks needed to complete a goal may correspond to completion of several respective sub-goals. Accordingly, a task may be considered a type of goal, and the terms "goal" and "task" may be employed interchangeably herein.

A percentage completion column 236 lists the corresponding percentage completion status adjacent to each associated goal identified in the goal name column 234. A feedback column 238 lists links or buttons in the row associated with the corresponding goal. Selection of a feedback link or button in the feedback column 238 triggers display of any feedback that is associated with the particular goal identified in the row.

Alternatively, the feedback column 238 may be omitted, and instead, a single feedback button may be provided. User selection of a particular goal, e.g., by selection of a particular row in the section 232, followed by selection of the feedback button may cause retrieval of the feedback associated with the goal. The feedback may be displayed in a subsequently displayed user interface display screen, which is displayed in response to selection of the feedback button. In one embodiment, the additional display screen may include a performance evaluation document user interface display screen that illustrates the performance document where the feedback is lodged.

The user interface display screens 190, 210, 230. of FIGS. 14-16 may be implemented, for example, via the project/goal tracking application 34 and/or the social network application 36 of FIG. 1. The project/goal tracking application 34 and the social network application 36 of FIG. 1 may be implemented in part via existing software applications designed to facilitate managing projects and accompanying goals or tasks. Various readily available project management and social networking applications may be modified, by those skilled in the art with access to the present teachings, to work with an implementation of an embodiment discussed herein without undue experimentation.

Hence, certain embodiments discussed herein are adapted to support or promote periodic, e.g., daily, exchange of feedback between enterprise personnel, such as between managers and subordinate employees and between mentors and mentees.

As users of embodiments disclosed herein become accustomed to regularly giving and/or requesting feedback, the feedback exchange process may eventually become a natural part of working an enterprise working environment.

Managers, leaders, mentors, and so on may employ various embodiments disclosed herein to generate reminders to given feedback to employees, subordinates, students or mentees, and so on. Similarly, employees or mentees may employ various embodiments disclosed herein to request or ask for feedback from their managers, leaders, mentors, and so on.

Feedback reminders can be time-based or event based (e.g., goal-triggered) and may be linked to calendar meetings. For example, users can set reminders to be delivered a predetermined number of days or weeks before or after a particular calendar event, such as a performance review meeting.

Users can select talent management system content, i.e., insight, to be included with feedback reminders. The insight may provide enterprise personnel, i.e., users, with additional background and intelligence, which may be useful when providing or requesting targeted feedback.

Certain embodiments disclosed herein substantially differ from conventional calendar reminder systems, where reminders are typically not focused or targeted toward habitualizing feedback exchanges.

This invention differs from a standard automated reminder in its focused purpose and its use of targeted, individualized talent management information to enhance the resulting action, i.e., giving or receiving development feedback.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise. Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method, performed by a computer, for promoting feedback exchange in an enterprise, the method comprising:
   configuring, using the computer, a feedback reminder in response to user input to a goal completion feedback configuration page configured to be displayed on the computer, with the feedback reminder specifying a goal completion trigger value of a particular goal or task performed by a first member of the enterprise that will trigger feedback;
   receiving, at the computer, a goal completion value indicating a level of completion of a goal assigned for completion to a first member of the enterprise, where the goal completion value indicates the extent to which the goal has been completed by the first member of the enterprise;
   determining, using the computer, whether the goal completion value is sufficient to trigger a feedback reminder based on comparing the goal completion trigger value to the received goal completion value; and
   automatically sending, using the computer and a messaging system or application, a feedback reminder to a second member of the enterprise designated to receive feedback regarding the level of completion of the goal by the first member of the enterprise if the goal completion value is sufficient to trigger feedback.

2. The method of claim 1 further comprising:
   designating a member of the enterprise to receive a feedback reminder in response to user input to a feedback configuration page displayed on the computer.

3. The method of claim 1, wherein using the messaging system or application includes displaying feedback provided in response to the feedback reminder in proximity to an indication of the goal.

4. The method of claim 1, wherein the feedback reminder includes a list of proposed feedback providers.

5. The method of claim 4, wherein the list of proposed feedback providers includes a list of names of persons associated with the goal.

6. The method of claim 4, further including providing a first user option for a user to request feedback in response to receipt of the feedback reminder.

7. The method of claim 1, further including providing a second user option to send a request for feedback in response to receipt of the feedback reminder.

8. The method of claim 7, further including providing a third user option to view feedback received in response to a request for feedback.

9. The method of claim 8, further including automatically associating the feedback with a performance management document.

10. The method of claim 1, further including providing one or more user interface options to view feedback from a user interface display screen that displays one or more indications of goals or tasks associated with the feedback.

11. The method of claim 1, further including, in response to the configuring, using a processor to automatically select insight information relating to a performance evaluation of a person.

12. The method of claim 11, wherein using the messaging system further includes displaying the feedback reminder in proximity to a user option to access the insight information.

13. The method of claim 11, wherein providing one or more user interface controls includes providing a first user interface control for enabling a user to select particular insight for inclusion in the feedback reminder.

14. The method of claim 13, wherein the particular insight includes one or more stated goals.

15. The method of claim 13, wherein the particular insight includes content of a career statement.

16. The method of claim 13, wherein the particular insight includes a specification of a predetermined competency or lack thereof.

17. The method of claim 11, wherein the feedback reminder includes an option to reissue the feedback reminder after a predetermined interval.

18. The method of claim 11, wherein providing one or more user interface controls includes providing a user option to trigger retrieval of information pertaining to a feedback recipient from an Enterprise Resource Planning (ERP) application for inclusion in the feedback reminder.

19. An apparatus comprising:
   a digital processor coupled to a display and to a processor-readable storage device, wherein the processor-readable storage device includes one or more instructions executable by the digital processor to perform the following acts:
   configuring a feedback reminder in response to user input to a goal completion feedback configuration page configured to be displayed on the computer, with the feedback reminder specifying a goal completion trigger value of a particular goal or task performed by a first member of the enterprise that will trigger feedback;
   receiving a goal completion value indicating a level of completion of a goal assigned for completion to a first member of the enterprise, where the goal completion value indicates the extent to which the goal has been completed by the first member of the enterprise;
   determining whether the goal completion value is sufficient to trigger a feedback reminder based on comparing the goal completion trigger value to the received goal completion value; and
   automatically sending, using a messaging system or application, a feedback reminder to a second member of the enterprise designated to receive feedback regarding the level of completion of the goal by the first member of the enterprise if the goal completion value is sufficient to trigger feedback.

20. A processor-readable storage device including instructions executable by a digital processor, the processor-readable storage device including one or more instructions for:
configuring a feedback reminder in response to user input to a goal completion feedback configuration page configured to be displayed on the computer, with the feedback reminder specifying a goal completion trigger value of a particular goal or task performed by a first member of the enterprise that will trigger feedback;
receiving a goal completion value indicating a level of completion of a goal assigned for completion to a first member of the enterprise, where the goal completion value indicates the extent to which the goal has been completed by the first member of the enterprise;
determining whether the goal completion value is sufficient to trigger a feedback reminder based on comparing the goal completion trigger value to the received goal completion value; and
automatically sending, using a messaging system or application, a feedback reminder to a second member of the enterprise designated to receive feedback regarding the level of completion of the goal by the first member of the enterprise if the goal completion value is sufficient to trigger feedback.

* * * * *

UNITED STATES PATENT AND TRADEMARK OFFICE
CERTIFICATE OF CORRECTION

PATENT NO.        : 8,473,319 B2  
APPLICATION NO.   : 13/407326  
DATED             : June 25, 2013  
INVENTOR(S)       : Yokoi et al.

Page 1 of 1

It is certified that error appears in the above-identified patent and that said Letters Patent is hereby corrected as shown below:

In the Specification

In column 13, line 16, delete "FIG. 1" and insert -- FIG. 1. --, therefor.

In column 14, line 37, delete "to" and insert -- the --, therefor.

In column 15, line 66, delete "230." and insert -- 230, --, therefor.

In column 17, line 19-27, after "otherwise." delete "Thus, while particular......spirit." and insert the same on Col. 17, Line 20, as a new Paragraph.

Signed and Sealed this  
Eighth Day of October, 2013

Teresa Stanek Rea  
*Deputy Director of the United States Patent and Trademark Office*